United States Patent
Kim et al.

(10) Patent No.: US 7,327,259 B2
(45) Date of Patent: Feb. 5, 2008

(54) METHOD AND APPARATUS FOR MANAGING ONLINE AND OFFLINE DOCUMENTS WITH RFID TECHNOLOGY

(75) Inventors: Ju Han Kim, Daejeon (KR); Joo Young Lee, Guri (KR); Ki Young Moon, Daejeon (KR); Jong Soo Jang, Daejeon (KR); Sung Won Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 204 days.

(21) Appl. No.: 11/091,366

(22) Filed: Mar. 29, 2005

(65) Prior Publication Data

US 2006/0092024 A1    May 4, 2006

(30) Foreign Application Priority Data

Oct. 29, 2004    (KR) .................... 10-2004-0087042

(51) Int. Cl.
*G08B 13/14* (2006.01)

(52) U.S. Cl. .................. 340/572.1; 340/572.4; 340/5.2; 340/5.21; 340/5.8; 340/10.1; 340/10.3

(58) Field of Classification Search ............ 340/572.1, 340/572.3, 572.4, 5.2, 5.8, 5.21, 5.54, 10.1, 340/10.3; 713/168, 169, 171, 175, 181
See application file for complete search history.

(56) References Cited

U.S. PATENT DOCUMENTS

| | | | |
|---|---|---|---|
| 5,321,750 A * | 6/1994 | Nadan | 380/230 |
| 5,629,981 A | 5/1997 | Nerlikar et al. | |
| 5,864,667 A * | 1/1999 | Barkan | 726/10 |
| 6,545,767 B1 * | 4/2003 | Kuroyanagi | 358/1.14 |

FOREIGN PATENT DOCUMENTS

| KR | 1020020003775 | 1/2002 |
|---|---|---|
| KR | 20-0364953 | 10/2004 |

\* cited by examiner

*Primary Examiner*—Hung Nguyen
(74) *Attorney, Agent, or Firm*—Lowe Hauptman Ham & Berner LLP

(57) ABSTRACT

Provided are a method and an apparatus for managing online and offline documents using RFID technology. The method includes: pre-registering online and offline documents using radio frequency identification tag information stored in at least one of the online and offline documents to be output; determining whether the pre-registered online and offline documents are authorized to be output; and if it is determined that the pre-registered online and offline documents are authorized to be output, generating documents of the online and offline documents to be output and storing new radio frequency identification tag information in radio frequency identification tags attached to the documents to be output.

7 Claims, 7 Drawing Sheets

METHOD AND APPARATUS FOR MANAGING ONLINE AND OFFLINE DOCUMENTS WITH RFID TECHNOLOGY

BACKGROUND OF THE INVENTION

This application claims the priority of Korean Patent Application No. 10-2004-0087042, filed on Oct. 29, 2004, in the Korean Intellectual Property Office, the disclosure of which is incorporated herein in its entirety by reference.

1. Field of the Invention

The present invention relates to a method and an apparatus for managing online and offline documents using radio frequency identification (RFID) technology, and more particularly, to a system for providing online and offline document security service using RFID technology.

2. Description of the Related Art

In recent days, enterprises, government and public offices, schools, monetary organizations, up-to-date technology research institutes, and the like manage internal document data and share information using a Knowledge Management System (KMS) or Electronic Document Management System (EDMS) so as to improve efficiency of affairs.

However, in a conventional document security method, online documents are given security only against online accesses. Thus, matters printed online and copied and transmitted matters of the online printed matters cannot be managed. Also, methods and apparatuses for managing drain and scrap of documents output offline have not been suggested.

SUMMARY OF THE INVENTION

The present invention provides a method and an apparatus for managing online and offline documents by which an online document can include RFID tag information in a management stage, RFID tags can include the RFID tag information using a document output apparatus in an output stage, the RFID tag information can be managed to be related to the original online document using an online document management server, new RFID tag information can be received from the online document management server to copy and transmit the online document including the RFID tags so as to store the new RFID tag information in the RFID tags, and the RFID tags can be attached to or included in the online document so as to be managed.

The present invention also provides a method and an apparatus for managing online and offline documents by which drain of output documents outside offices, companies, or the like can be managed using an RFID reader and positions of documents to be scraped can be checked using the RFID reader so as to easily scrap the documents.

According to an aspect of the present invention, there is provided an apparatus for managing online and offline documents using radio frequency identification technology, including: a document management server receiving radio frequency identification tag information stored in the online and offline documents from a document management client and a document output apparatus to manage the online and offline documents; a receiver receiving extracted radio frequency identification tag information from one of the document management client and the document output apparatus; a radio frequency identification tag information analyzer receiving and analyzing the radio frequency identification tag information and extracting history information of a document comprising the radio frequency identification tag information to generate a radio frequency identification tag information analysis signal; a document management information register receiving the radio frequency identification tag information analysis signal to store the history information of the document and generating new radio frequency identification tag information to be stored in a document to be output using the history information; a transmitter transmitting the new radio frequency identification tag information to one of the document management client and the document output apparatus extracting the radio frequency identification tag information; and a controller controlling an output and a circulation of the document using the radio frequency identification tag information analysis signal.

According to another aspect of the present invention, there is provided a document output apparatus receiving data of an online document to be output and radio frequency identification tag information stored in the online document data from a document management client to output the online document as an offline document, including: a receiver receiving the data of the online document and the radio frequency identification tag information from the document management client and receiving new radio frequency identification tag information to be stored in radio frequency identification tags of a document to be output, the document being generated by a document management server, based on the radio frequency identification tag information; a transmitter transmitting the radio frequency identification tag information to the document management server; a printer output unit outputting an offline document based on the data of the online document and storing the new radio frequency identification tag information in radio frequency identification tags attached to the offline document; and a controller transmitting the data of the online document and the new radio frequency identification tag information received from the receiver to the printer output unit.

According to still another aspect of the present invention, there is provided a document output apparatus extracting an offline document to be output and radio frequency identification tag information stored in the offline document to output a new offline document, including: a copy input unit extracting data of the offline document; a radio frequency identification tag information extractor extracting the radio frequency identification tag information stored in radio frequency identification tags of the offline document; a transmitter transmitting the radio frequency identification tag information extracted by the radio frequency identification tag information extractor to a document management server; a receiver receiving the radio frequency identification tag information to be stored in radio frequency identification tags of a new offline document to be output from the document management server; a copy output unit outputting the new offline document based on the data of the offline document to be output and storing the new radio frequency identification tag information in radio frequency identification tags attached to the new offline document; and a controller transmitting the data of the offline document received from the copy input unit and the radio frequency identification tag information received from the receiver to the copy output unit.

According to yet another aspect of the present invention, there is provided a receiver document output apparatus receiving output data of a document to be output and radio frequency identification tag information from a document management server using the document transmitted from a transmitter document output apparatus to the document management server, the radio frequency identification tag information, and receiver document output apparatus information, including: a receiver receiving the data of the document and the radio frequency identification tag information stored in the document from a document management client and receiving new radio frequency identification tag information to be stored in radio frequency identification tags of a document to be output, the document being generated by the document management server, based on the radio frequency identification information; a transmitter transmitting the radio frequency identification tag information to the document management server; a facsimile output unit outputting the offline document based on the data of the document and storing the new radio frequency identification tag information in radio frequency identification tags attached to the offline document; and a controller transmitting the data of the online document and the new radio frequency identification tag information received from the receiver to the facsimile output unit.

According to yet another aspect of the present invention, there is provided a method of managing online and offline documents using a document management server receiving radio frequency identification tag information stored in the online and offline documents received from a document management client and a document output apparatus to manage the online and offline documents, including: pre-registering online and offline documents using radio frequency identification tag information stored in at least one of the online and offline documents to be output; determining whether the pre-registered online and offline documents are authorized to be output; and if it is determined that the pre-registered online and offline documents are authorized to be output, generating documents of the online and offline documents to be output and storing new radio frequency identification tag information in radio frequency identification tags attached to the documents to be output.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
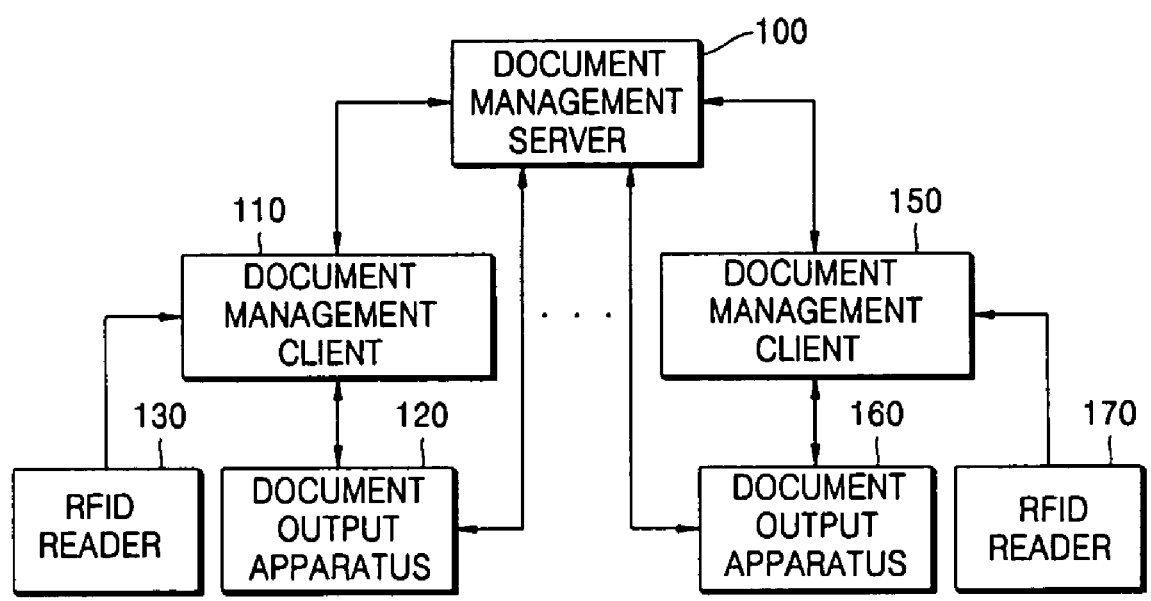
FIG. 1 is a block diagram of an apparatus for managing online and offline documents using RFID technology according to an embodiment of the present invention.

FIG. 1 is a block diagram of an apparatus for managing online and offline documents using RFID technology according to an embodiment of the present invention.

Referring to FIG. 1, the apparatus includes a document management server 100, document management clients 110 and 150, document output apparatuses 120 and 160, and RFID readers 130 and 170. Here, two document management clients 110 and 150, two document output apparatuses 120 and 160, and two RFID readers 130 and 170 are shown in FIG. 1. However, the structure of the apparatus shown in FIG. 1 may be modified into various other forms.

The document output apparatuses 120 and 160 are controlled by the document management clients 110 and 150 and the document management servers 100 interconnected via a network to store RFID tag information in RFID tags attached to or included in documents to be output so as to output the documents including the RFID tag information. In detail, the document output apparatuses 120 and 160 may be printers, copiers, facsimiles, or the like. A printer, a copier, and facsimiles will be described in detail with reference to FIGS. 2A through 2C.

The document management clients 110 and 150 provide RFID tag information of online documents and data of documents to be output to the document output apparatuses 120 and 160, respectively. The document management clients 110 and 150 are controlled by the document management server 100 so as to provide RFID tag information of online documents they have to the document management server 100.

The RFID readers 130 and 170 detect RFID tag information from RFID tags attached to output offline documents and provide RFID detection signals to the document management clients 110 and 150. The document management clients 110 and 150 receive the RFID detection signals from the RFID readers 130 and 170 and transmit the RFID detection signals to the document management server 100. In the present embodiment, the RFID readers 130 and 170 transmit the RFID detection signals to the document management clients 110 and 150. However, according to an aspect of the present invention, the RFID readers 130 and 170 may directly transmit the RFID detection signals to the document management server 100.

The document management-server 100 determines whether to authorize an output of a corresponding document, manages values stored in the RFID tags and document information related to the RFID tags, and performs a log function of managing generation, output, copy, transmission, drain, and scrap of documents including RFID tags.

The document management server 100 possesses information for accessing a document of each online management server according to a security level to determine whether to authorize an output of the document. The document management server 100 also includes information as to document level access authorities of receiver document output apparatuses for document output apparatuses for transmitting documents (for example, transmitting documents via facsimiles or the like). The more detailed structure of the document management server 100 will be described later with reference to FIG. 3.

Figure 2A:
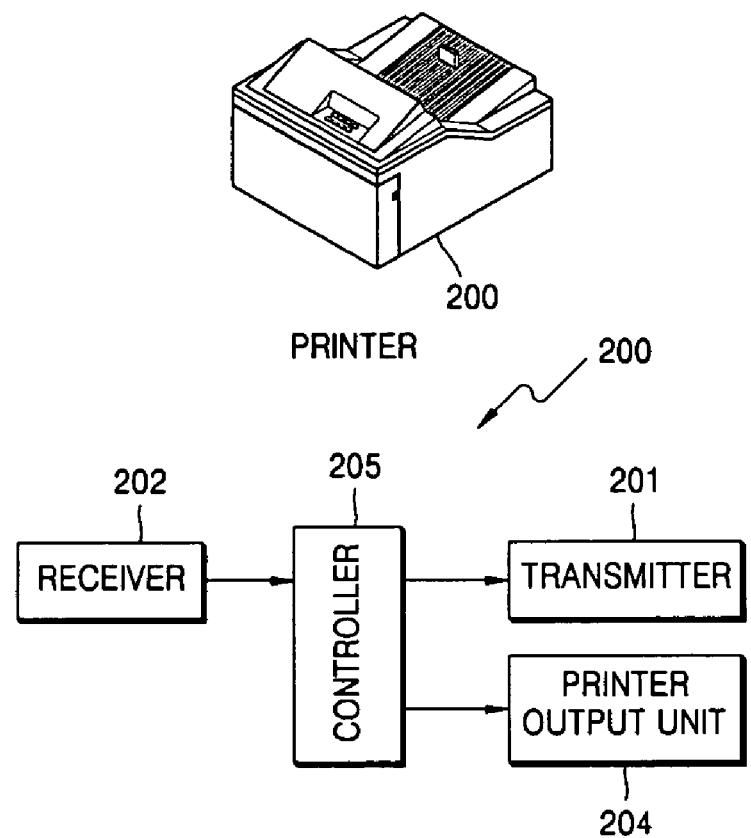
FIG. 2A is a view illustrating a document output apparatus as shown in FIG. 1 according to an embodiment of the present invention.

FIG. 2A is a view illustrating an example of the document output apparatuses 120 and 160 shown in FIG. 1. Referring to FIG. 2A, an offline output apparatus for an online document outputs an online document as an offline document like a printer 200. The printer 200 transmits a document online to output the document offline and includes a transmitter 201, a receiver 202, a printer output unit 204, and a controller 205.

The document management clients 110 and 150 transmit data of an online document to be output and RFID tag information to the receiver 202 of the printer 200.

The receiver 202 transmits the data of the online document to be output and the RFID tag information to the controller 205.

The controller 205 transmits the data of the online document to be output to the printer output unit 204 and the RFID tag information through the transmitter 201 to the document management server 100.

The document management server 100 generates new RFID tag information in consideration of the property of the RFID tag information received from the transmitter 201 and transmits the new RFID tag information to the receiver 202.

The receiver 202 receives the new RFID tag information from the document management server 100 and transmits the new RFID tag information to the controller 205.

The controller 205 transmits the new RFID tag information to the printer output unit 204.

The printer output unit 204 receives the data of the document from the controller 205 and includes the data of the document in an offline document to be output and stores the new RFID tag information in RFID tags formed in the offline document. Here, RFID tags are attached to or included in a document and output via the printer 200.

Figure 2B:
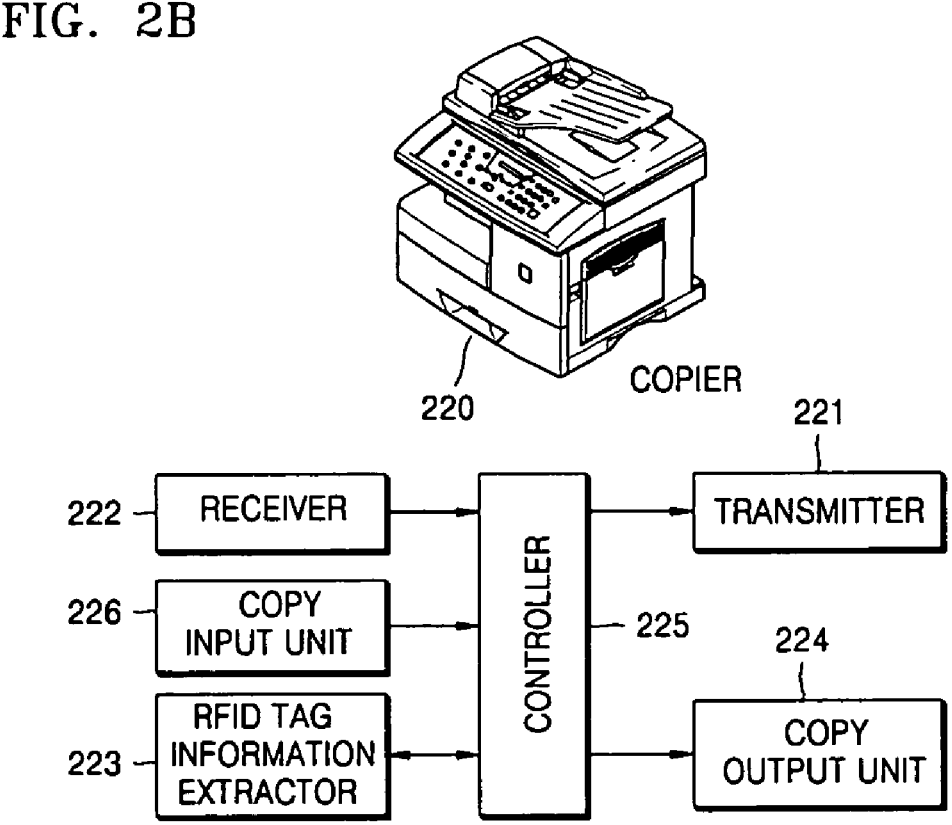
FIG. 2B is a view illustrating a document output apparatus as shown in FIG. 1 according to another embodiment of the present invention.

FIG. 2B is a view illustrating another example of the document output apparatuses 120 and 160 shown in FIG. 1. Referring to FIG. 2B, an offline output apparatus for an offline document outputs an offline document as a new offline document like a copier 220. The copier 220 includes a transmitter 221, a receiver 222, a RFID tag information extractor 223, a copy output unit 224, a controller 225, and a copy input unit 226.

The RFID tag information extractor 223 extracts RFID tag information from RFID tags attached to or included in an offline document and transmits the RFID tag information to the controller 225.

The copy input unit 226 copies an offline document to be currently output and transmits data of the offline document to the controller 225.

The transmitter 221 receives the extracted RFID tag information from the controller 225 and transmits the extracted RFID tag information to the document management server 100.

The document management server 100 generates new RFID tag information in consideration of the property of the RFID tag information received from the transmitter 221 and transmits the new RFID tag information to the receiver 222.

The receiver 222 receives the new RFID tag information from the document management server 100 and transmits the new RFID tag information to the controller 225.

The controller 225 transmits the new RFID tag information to the copy output unit 224.

The copy output unit 224 receives data of the document to be currently output from the controller 225, outputs the data of the document by attaching the data of the document to an offline document, and stores the new RFID tag information in RFID tags formed in the offline document. Here, RFID tags are attached to or included in a document and output through the copier 220 to the outside.

Figure 2C:
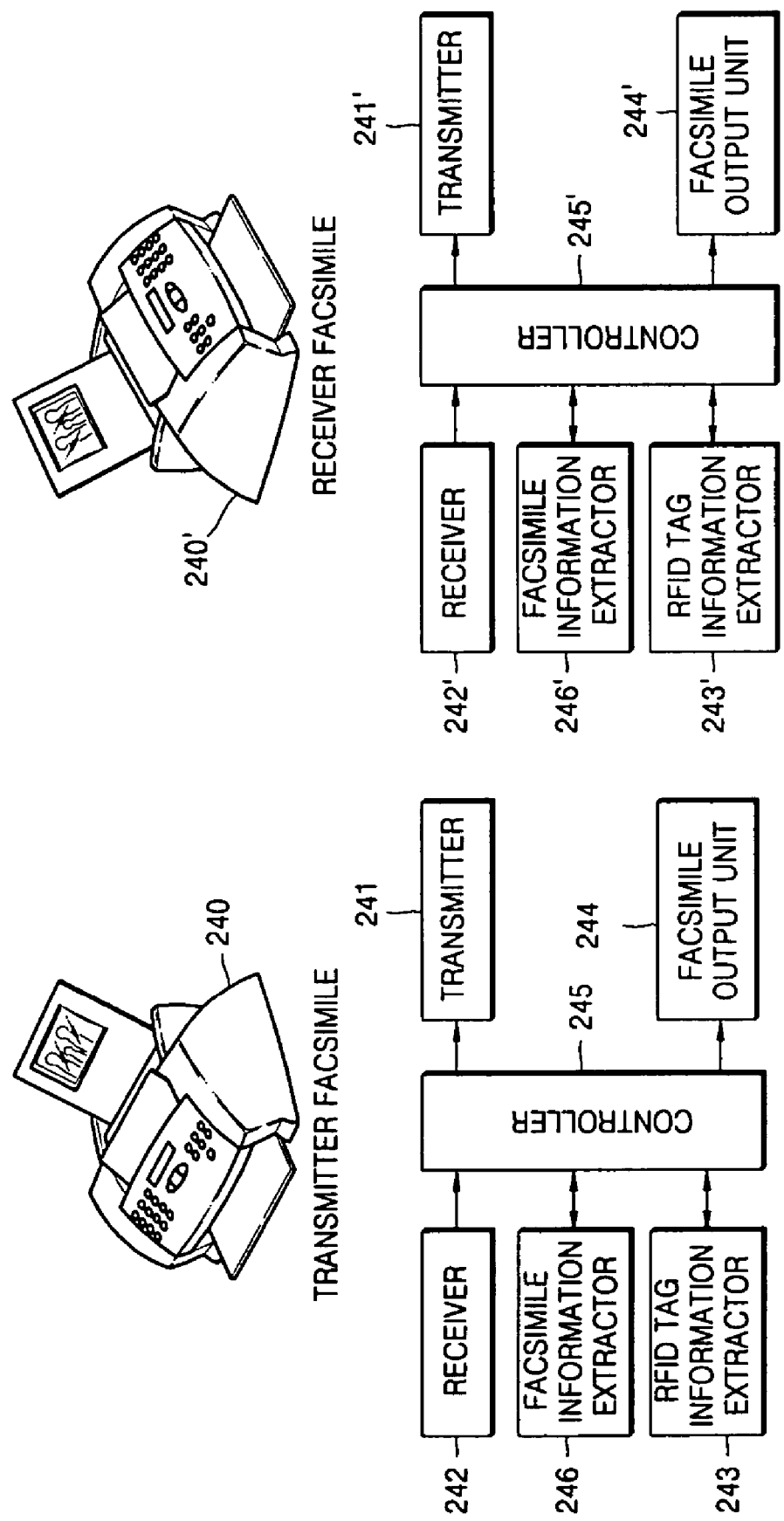
FIG. 2C is a view illustrating a document output apparatus as shown in FIG. 1 according to still another embodiment of the present invention

FIG. 2C is a view illustrating another example of the document output apparatuses 120 and 160 shown in FIG. 1. Referring to FIG. 2C, like a facsimile, when a transmitter output apparatus receives an online or offline document and transmits the online or offline document to a new transmitter output apparatus, the new transmitter output apparatus outputs the online or offline document as an offline document.

A transmitter facsimile 240 includes a transmitter 241, a receiver 242, an RFID tag information extractor 243, a facsimile output unit 244, a controller 245, and a facsimile information extractor 246.

A receiver facsimile 240' includes a transmitter 241', a receiver 242', a RFID tag information extractor 243', a facsimile output unit 244', a controller 245', and a facsimile information extractor 246'.

A transmitter output unit for an online document will now be described.

The document management client 110 transmits data of an online document to be output, RFID tag information, and receiver facsimile information to the receiver 242 of the transmitter facsimile 240.

The receiver 242 transmits the data of the online document, the RFID tag information, and the receiver facsimile information to the controller 245.

The controller 245 controls the transmitter 241 to transmit the data of the online document, the RFID tag information, and the receiver facsimile information to the document management server 100.

The document management server 100 checks the receiver facsimile 240' using the receiver facsimile information received from the transmitter 241 and then transmits the data of the online document and the RFID tag information to the receiver facsimile 240'.

The receiver 242' of the receiver facsimile 240' receives the data of the online document and the RFID tag information from the document management server 100.

The receiver 242' transmits the data of the online document and the RFID tag information to the controller 245'.

The controller 245' transmits the data of the online document to the facsimile output unit 244' and controls the transmitter 241' to transmit the RFID tag information to the document management server 100.

The document management server 100 generates new RFID tag information in consideration of the property of the RFID tag information received from the transmitter 241' and transmits the new RFID tag information to the receiver 242'.

The receiver 242' receives the new RFID tag information from the document management server 100 and transmits the new RFID tag information to the controller 245'.

The controller 245' transmits the new RFID tag information to the facsimile output unit 244'.

The facsimile output unit 244' receives the data of the document to be output from the controller 245', outputs the data of the online document by attaching the data of the document to an offline document and stores the new RFID tag information in RFID tags formed in the offline document. Here, RFID tags are attached to or included in a document and output through the receiver facsimile 240' to the outside.

A transmitter output apparatus for an offline document will now be described.

The RFID tag information extractor 223 extracts RFID tag information from an offline document and transmits the RFID tag information to the controller 225.

The facsimile information extractor 246 extracts data of a document to be output and information as to a receiver facsimile to which the document is to be transmitted and transmits the data of the document and the information as to the receiver facsimile to the controller 245.

The transmitter 241 receives the RFID tag information, the data of the document, and the receiver facsimile information from the controller 245 and transmits the RFID tag information, the data of the document, and the receiver facsimile information to the document management server 100.

The document management server 100 receives the data of the document, the RFID tag information, and the receiver facsimile information from the transmitter 241 and transmits the data of the document, the RFID tag information to the transmitter facsimile 240'.

The receiver 242' of the receiver facsimile 240' receives the data of the document and the RFID tag information from the document management server 100.

The receiver 242' transmits the data of the document and the RFID tag information to the controller 245'.

The controller 245' transmits the data of the document to the facsimile output unit 244' and controls the transmitter 241' to transmit the RFID tag information to the document management server 100.

The document management server 100 generates new RFID tag information in consideration of the property of the RFID tag information received from the transmitter 241' and transmits the new RFID tag information to the receiver 242'.

The receiver 242' receives the new RFID tag information from the document management server 100 and transmits the new RFID tag information to the controller 245'.

The controller 245' transmits the new RFID tag information to the facsimile output unit 244'.

The facsimile output unit 244' receives the data of the document to be output from the controller 245', outputs the data of the document by attaching the data of the document to an offline document, and stores the new RFID tag information in RFID tags formed in the offline document. Here, RFID tags are attached to or included in a document and output through the receiver facsimile 240' to the outside.

Referring to FIGS. 2A through 2C, a document output apparatus can be classified into three types: an offline output apparatus for an online document, an offline output apparatus for an offline document (a paper document to which RFID tags are attached or in which RFID tags are included, the RFID tags including information as to the paper document), and a transmitter output apparatus for online and offline documents. The printer 200, the copier 220, and the facsimile 240 have been described with reference to FIGS. 2A through 2C. However, a document output apparatus may be various forms.

Figure 3:
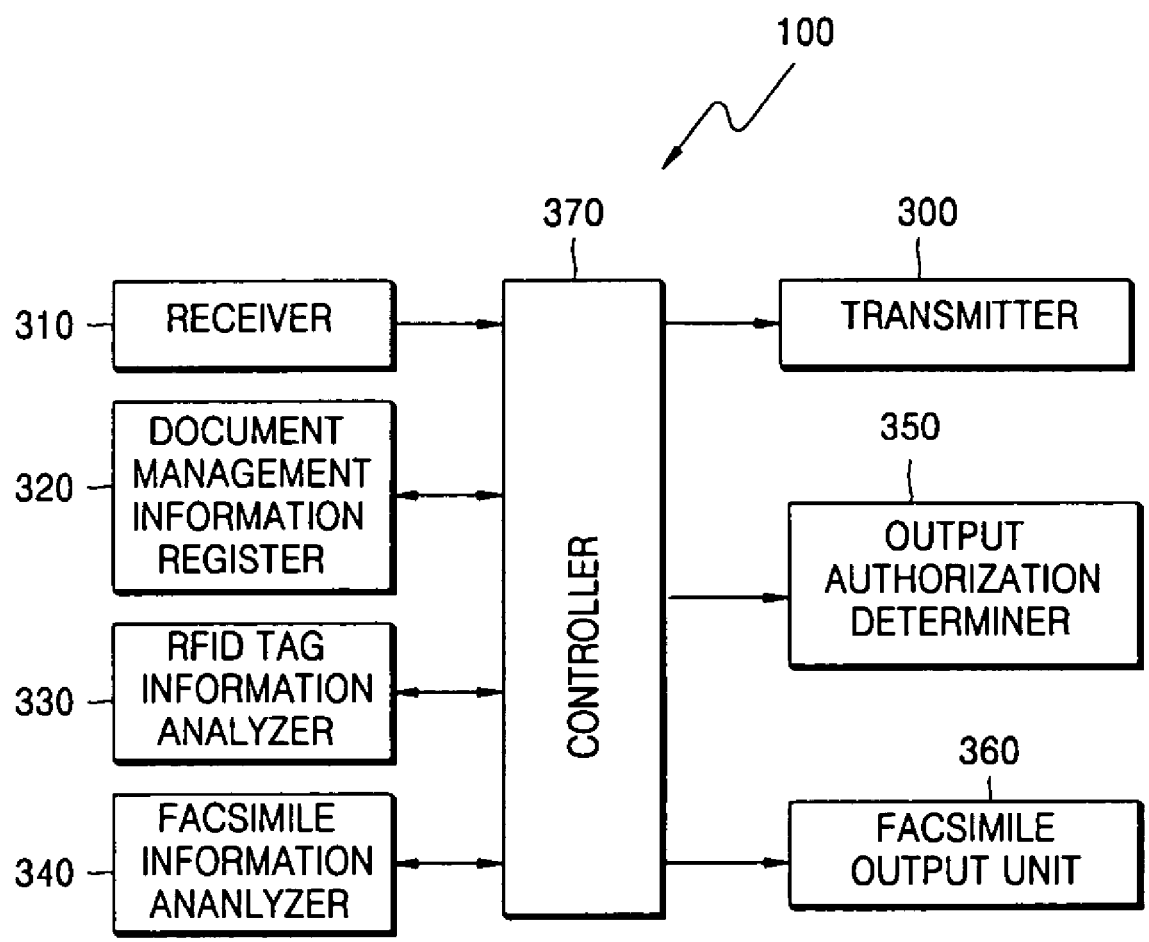
FIG. 3 is a view illustrating a document management server shown in FIG. 1 according to an embodiment of the present invention.

FIG. 3 is a view illustrating the document management server 100 shown in FIG. 1 according to an embodiment of the present invention. Referring to FIG. 3, the document management server 100 includes a transmitter 300, a receiver 310, a document management information register 320, a RFID tag information analyzer 330, a facsimile information analyzer 340, an output authorization determiner 350, a display unit 360, and a controller 370.

A case where the document output apparatuses 120 and 160 are printers and copiers will now be described.

The receiver 310 receives RFID tag information from the document output apparatuses 120 and 160. The receiver 310 also receives RFID tag information of an online document from the document management clients 110 and 150.

The receiver 310 transmits the RFID tag information to the controller 370. The controller 370 transmits the RFID tag information received from the receiver 310 to the RFID tag information analyzer 330.

The RFID tag information analyzer 330 analyzes the RFID tag information to detect various types of history information as to the online document. Thus, generation, print, copy, transmission, drain, and scrap histories of the online document can be managed. The RFID tag information analyzer 330 transmits an RFID tag information analysis signal generated by analyzing the RFID tag information to the controller 370.

The controller 370 transmits the RFID tag information analysis signal to the document management information register 320. The document management information register 320 stores new document management information as to a corresponding document and transmits new RFID tag information to the controller 370.

The controller 370 controls the transmitter 300 to transmit the new RFID tag information to the document output apparatuses 120 and 160 or the document management clients 110 and 150.

A case where the document output apparatuses 120 and 160 are facsimiles will now be described.

The receiver 310 receives RFID tag information, data of a document to be output, and receiver facsimile information from the document output apparatuses 120 and 160.

The controller 370 receives the receiver facsimile information from the receiver 310 and transmits the receiver facsimile information to the facsimile information analyzer 340.

The facsimile information analyzer 340 receives the receiver facsimile information from the controller 370, analyzes the receiver facsimile information to determine whether a receiver facsimile can receive the receiver facsimile information, and if it is determined that the receiver facsimile can receive the receiver facsimile information, transmits information as to a position of the receiver facsimile to the controller 370.

The controller 370 receives the information as to the position of the receiver facsimile from the facsimile information analyzer 340 and transmits the data of the document and the RFID tag information received from the receiver 310 through the transmitter 300 to the receiver facsimile.

It has been described that the controller 370 transmits the data of the document and the RFID tag information received from the receiver 310 through the transmitter 300. However, the controller 370 may directly transmit the RFID tag information received from the receiver 310 to the RFID tag information analyzer 330, store the RFID tag information in the document management information register 320 using the RFID tag analysis signal analyzed by the RFID tag information analyzer 330, and transmit the new RFID tag information generated using the RFID tag analysis signal through the transmitter 300 to the receiver facsimile.

Figure 4:
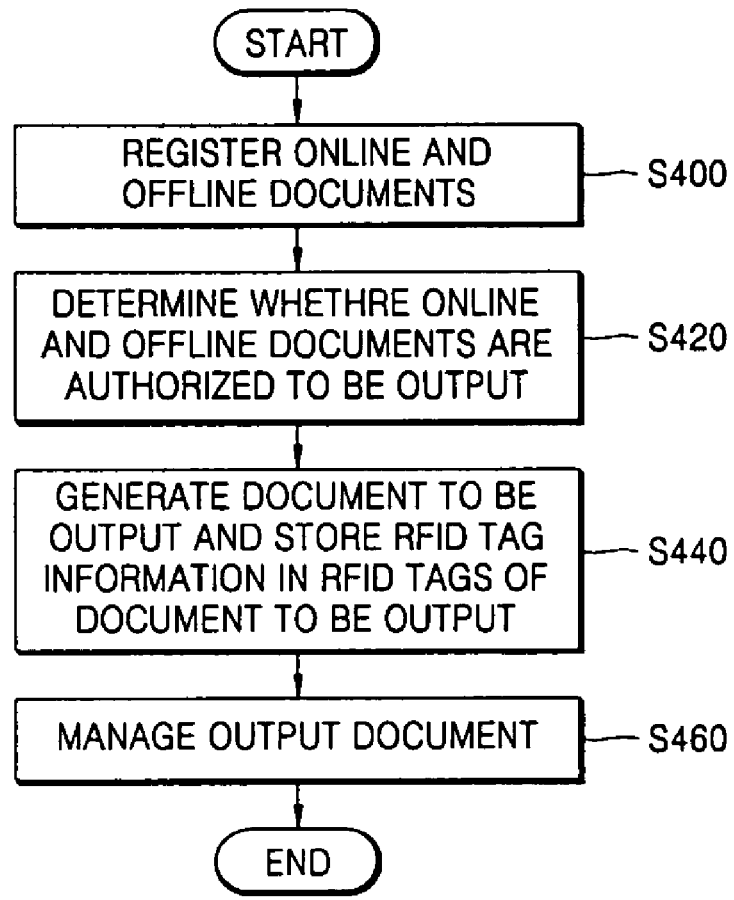
FIG. 4 is a flowchart of a method of managing online and offline documents using RFID technology according to an embodiment of the present invention.

FIG. 4 is a flowchart of a method of managing online and offline documents using RFID technology according to an embodiment of the present invention. Referring to FIG. 4, in operation S400, RFID tag information stored in RFID tags of an online document generated by the document management clients 110 and 150 and an offline document output by the document output apparatuses 120 and 160 are registered.

In operation S420, a determination is made as to whether the online and offline documents are authorized to be printed, copied, and transmitted. In operation S440, printed, copied, and transmitted matters of the online and offline documents are generated and RFID tag information is stored in RFID tags of the printed, copied, and transmitted matters (documents to be output).

In operation S460, drain and scrap of the output offline document are managed by the RFID readers 130 and 170.

Operations S400, S420, and 460 of the method of FIG. 4 will be describe in more detail below.

Figure 5:
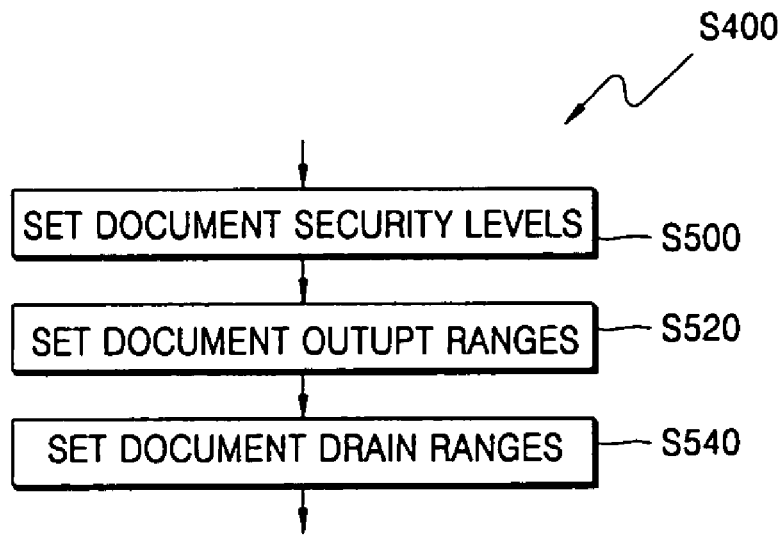
FIG. 5 is a flowchart of operation S400 of the method of FIG. 4.

FIG. 5 is a flowchart of operation S400 of the method of FIG. 4. Referring to FIG. 5, in operation S500, the document management server 100 sets security levels of online and offline documents using RFID tag information.

In operation S520, the document management server 100 sets ranges in which the online and offline documents are printed, copied, and transmitted, for example, a number of times online and offline documents are output and time limits for outputting the online and offline documents.

In operation S540, the document management server 100 determines ranges in which the online and offline documents are to be drained. Here, the document management server 100 stores new RFID tag information of documents generated when the online document is printed and the offline document is copied and transmitted.

Figure 6:
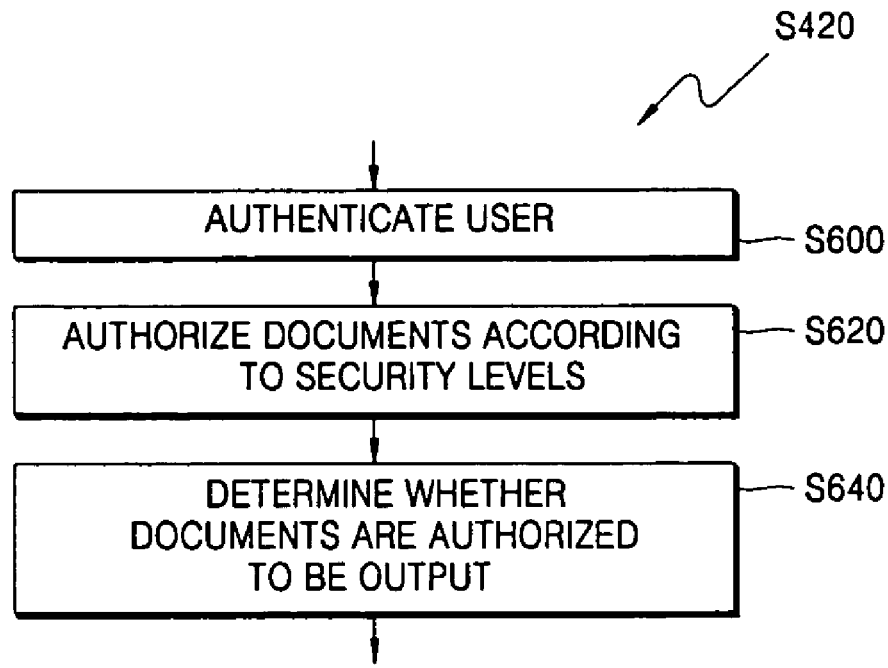
FIG. 6 is a flowchart of operation S420 of the method of FIG. 4.

FIG. 6 is a flowchart of operation S420 of the method of FIG. 4. Referring to FIG. 6, in operation S600, the document management server 100 authenticates a user desiring to output online and offline documents. In other words, for the user authentication, the document management server 100 checks user authentication information to determine whether the user using a current document output apparatus has an authority to access the document management server 100. In detail, the user authentication may be performed using various encryption methods.

In operation S620, the document management server 100 authenticates access ranges of the online and offline documents according to security levels using information as to the online and offline documents pre-registered in operation S400. In other words, the document management server 100 checks access information according to the security levels to determine whether the user having the authority to access the document management server 100 have an authority to access a corresponding document level.

In operation S640, the output authorization determiner 350 of the document management server 100 determines whether the online and offline documents are authorized to be output using user authentication information and the access information according to the security levels.

Figure 7:
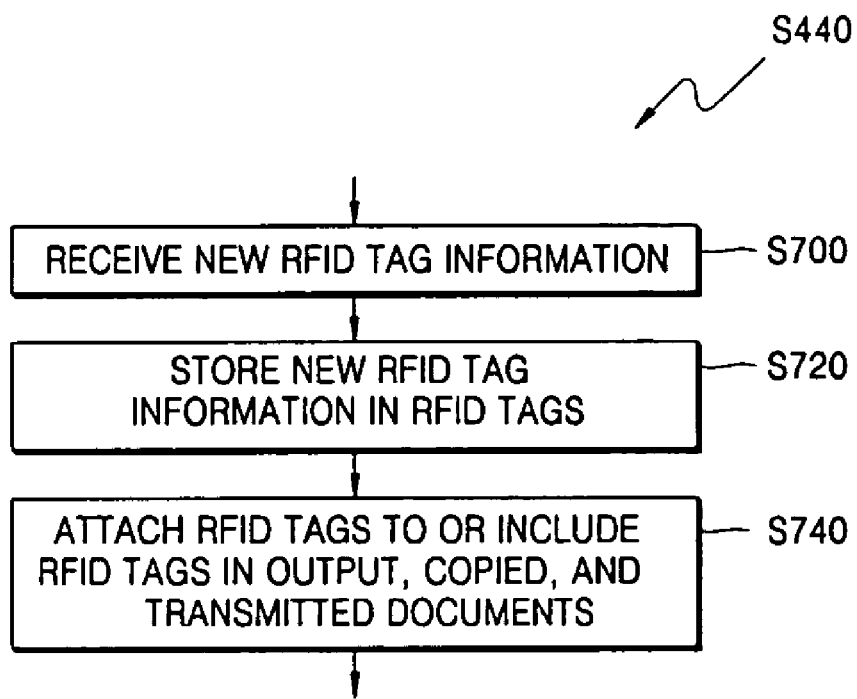
FIG. 7 is a flowchart of operation S440 of the method of FIG. 4.

FIG. 7 is a flowchart of operation S440 of the method of FIG. 4. Referring to FIG. 7, in operation S700, receivers of the document output apparatuses 120 and 160 receive new RFID tag information from the document management server 100.

In operation S720, the document output apparatuses 120 and 160 store the new RFID tag information in RFID tags attached to a document to be output.

In operation S740, the document output apparatuses 120 and 160 output the document to which the RFID tags are attached.

Figure 8:
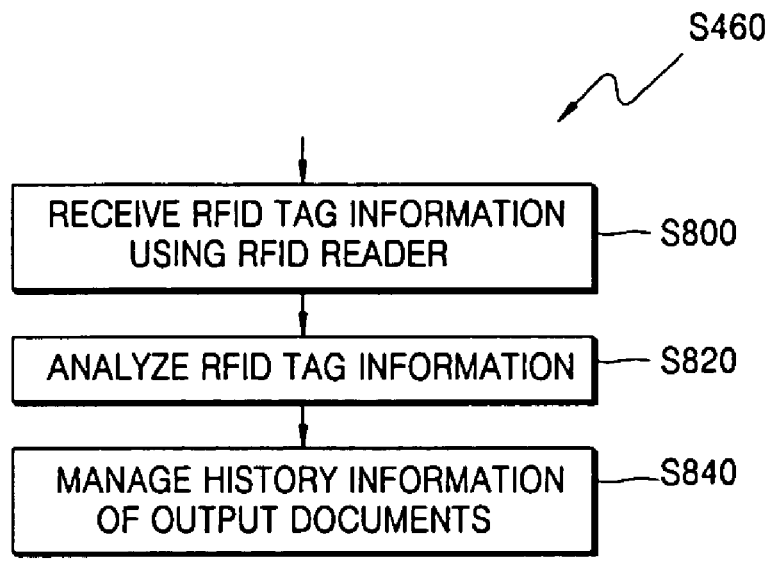
FIG. 8 is a flowchart of operation S460 of the method of FIG. 4 according to an embodiment of the present invention.

FIG. 8 is a flowchart of operation S460 of the method of FIG. 4 according to an embodiment of the present invention. Referring to FIG. 8, in operation S800, the receiver 310 of the document management server 100 receives RFID tag information obtained by reading RFID tags of an offline document using the RFID readers 130 and 170. Here, the receiver 310 may directly receive the RFID tag information from the RFID readers 130 and 170. In a case where the RFID readers 130 and 170 interface with the document management clients 110 and 150, respectively, the receiver 310 may receive the RFID tag information from the document management clients 110 and 150.

In operation S820, the RFID tag information analyzer 330 of the document management server 100 analyzes the RFID tag information to generate the RFID tag information analysis signal.

In operation S840, the document management server 100 manages history information of an output document using the RFID tag information analysis signal. In detail, the document management server 100 stores and manages the RFID tag information in the document management information register 320.

Figure 9:
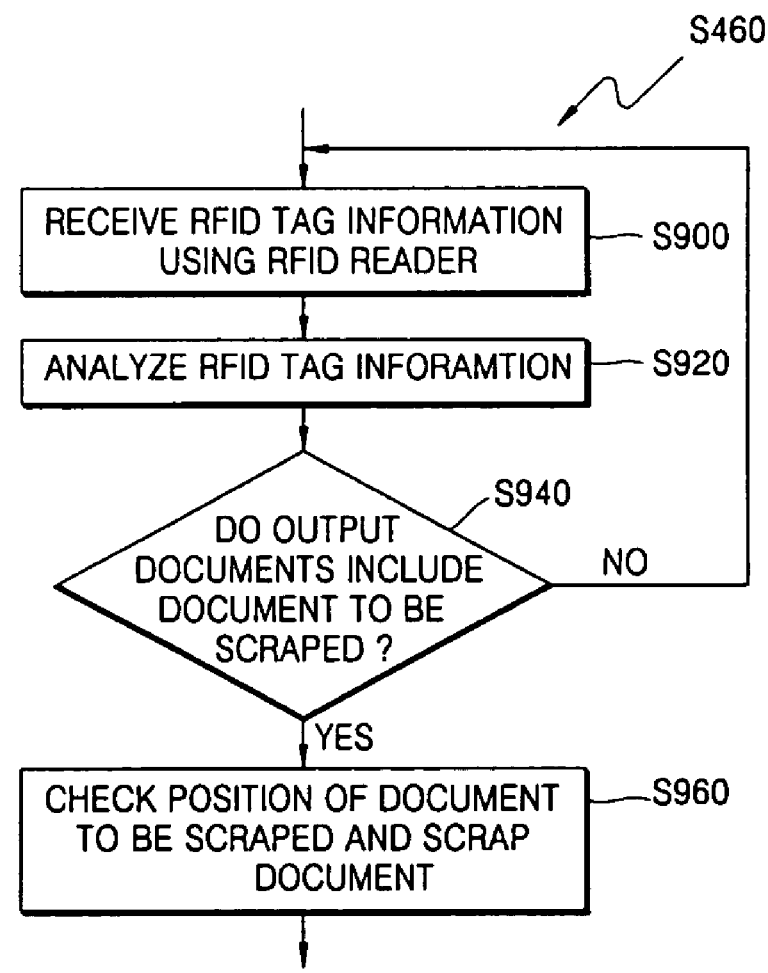
FIG. 9 is flowchart of operation S460 of the method of FIG. 4 according to another embodiment of the present invention.

FIG. 9 is a flowchart of operation S460 of the method of FIG. 4 according to another embodiment of the present invention. Referring to FIG. 9, in operation S900, the receiver 310 of the document management server 100 receives RFID tag information obtained by reading RFID tags of an offline document using the RFID readers 130 and 170. Here, the receiver 310 may directly receive the RFID tag information from the RFID readers 130 and 170. In a case where the RFID readers 130 and 170 interface with the document management clients 110 and 150, respectively, the receiver 310 may receive the RFID tag information from the document management clients 110 and 150.

In operation S920, the RFID tag information analyzer 330 of the document management server 100 analyzes the RFID tag information to generate the RFID tag information analysis signal.

In operation S940, the document management server 100 determines whether documents read by the RFID readers 130 and 170 include a document to be scraped. Here, the determination as to whether the documents includes the document to be scraped is made by comparing the RFID tag information analysis signal with the document management information stored in the document management information register 320. If the document management server 100 determines in operation S940 that the documents do not include the document to be scraped, the document management server 100 returns to operation S900. If the document management server 100 determines in operation S940 that the documents include the document to be scraped, the document management server 100 proceeds to operation S960.

In operation S960, the document management server 100 checks a position of the document to be scraped through the RFID tag information analyzer 330 and controls the document management clients 110 and 150 through the transmitter 300 to scrap the document. The document management server 100 may directly output a document scrap signal to a corresponding document output apparatus. In this case, the document management server 100 may display the document scrap signal on the display unit 360.

As described above, in a method and an apparatus for managing online and offline documents using RFID technology, a document security system can be provided so as to improve security, stability, and the convenience of a user.

Also, log information can be recorded and observed from the generation of each document to the scrap of the each document to check whether a document on which security level is output, copied, and transmitted to an authenticated user. In addition, drain of a security document outside an office or a company can be observed. When the security document is output, copied, and transmitted, RFID tags can be included in or attached to documents output from RFID output apparatuses. Thus, these documents can be managed. As a result, the overall document security service can be provided to online and offline documents.

Accordingly, the method and the apparatus of the present invention can be applied to army-related organizations or the government departments necessarily requiring security against offline documents and departments of companies in charge of new technology development. Thus, the companies can completely prevent documents from being drained by insiders. Also, a manager operating a system can minimize the management of networks and stably manage original document files to preserve intellectual property rights and to efficiently operate system.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for managing online and offline documents using radio frequency identification technology, comprising:
    a document management server receiving radio frequency identification tag information stored in the online and offline documents from a document management client and a document output apparatus to manage the online and offline documents;
    a receiver receiving extracted radio frequency identification tag information from one of the document management client and the document output apparatus;
    a radio frequency identification tag information analyzer receiving and analyzing the radio frequency identification tag information and extracting history information of a document comprising the radio frequency identification tag information to generate a radio frequency identification tag information analysis signal;
    a document management information register receiving the radio frequency identification tag information analysis signal to store the history information of the document and generating new radio frequency identification tag information to be stored in a document to be output using the history information;
    a transmitter transmitting the new radio frequency identification tag information to one of the document management client and the document output apparatus extracting the radio frequency identification tag information; and
    a controller controlling an output and a circulation of the document using the radio frequency identification tag information analysis signal.

2. The apparatus of claim 1, wherein the document output apparatus:
    receives output data of an online document to be output from the document management client and radio frequency identification tag information of the online document,
    transmits the radio frequency identification tag information to the document management server, receiving new radio frequency identification tag information to be stored in a document to be output, the document being generated by the document management server, and
    stores the radio frequency identification tag information in radio frequency identification tags of the document to be output.

3. The apparatus of claim 1, wherein the document output apparatus extracts output data of an offline document to be output and radio frequency identification tag information of the offline document, transmits the radio frequency identification tag information to the document management server, receives the new radio frequency identification tag information to be stored in a document to be output, the document being generated by the document management server, and stores the new radio frequency identification tag information in radio frequency identification tags of the document to be output.

4. The apparatus of claim 1, wherein the document output apparatus is a receiver document output apparatus receiving output data of a document to be output, the document being transmitted from a transmitter document output apparatus to the document management server and radio frequency identification tag information using the output data, the radio frequency identification tag information, and receiver document output apparatus information, transmitting the radio frequency identification tag information to the document management server, receiving the new radio frequency identification tag information to be stored in a document to be output, the document being generated by the document management server, and storing the new radio frequency identification tag information in radio frequency identification tags of the document to be output.

5. The apparatus of claim 1, further comprising: a radio frequency identification reader extracting radio frequency identification tag information of an offline document and transmitting the radio frequency identification tag information to the document management server, wherein the document management server obtains history information of the offline document using the radio frequency identification tag information to manage the offline document.

6. The apparatus of claim 1, wherein the document management server comprises: an output authorization determiner determining whether a user is authorized to access an online or offline document using history information of the online or offline document obtained using the radio frequency identification tag information analysis signal.

7. The apparatus of claim 6, wherein the output authorization determiner comprises: a display unit displaying that the user is not authorized to access the online or offline document.

* * * * *